(12) United States Patent
Mizutani (10) Patent No.: US 7,028,329 B1
(45) Date of Patent: Apr. 11, 2006

(54) REMOTE ACCESSIBLE PROGRAMMING

(75) Inventor: Kenji Mizutani, Mountain View, CA (US)

(73) Assignee: Seiko Epson Corporation, Tokyo (JP)

( * ) Notice: Subject to any disclaimer, the term of this patent is extended or adjusted under 35 U.S.C. 154(b) by 1124 days.

(21) Appl. No.: 09/687,271

(22) Filed: Oct. 13, 2000

(51) Int. Cl.
*H04N 7/173* (2006.01)

(52) U.S. Cl. .......................... 725/109; 725/86; 725/92; 725/93; 725/115; 725/116; 709/217; 709/218; 709/219; 386/46

(58) Field of Classification Search ................... 386/1, 386/52, 29, 83, 46; 709/217–219; 725/58, 725/109–110, 131–134, 139–142, 151–153, 725/91–93, 86, 114–116
See application file for complete search history.

(56) References Cited

U.S. PATENT DOCUMENTS

| | | | |
|---|---|---|---|
| 4,506,387 A | 3/1985 | Walter | |
| 4,920,432 A | 4/1990 | Eggers et al. | |
| 5,130,792 A | 7/1992 | Tindell et al. | |
| 5,420,913 A | 5/1995 | Hashimoto | |
| 5,608,534 A | 3/1997 | Park et al. | |
| 5,721,827 A | 2/1998 | Logan et al. | |
| 5,758,257 A | 5/1998 | Herz et al. | |
| 5,781,734 A | 7/1998 | Ohno et al. | |
| 5,787,259 A * | 7/1998 | Haroun et al. .............. | 709/253 |
| 5,905,521 A | 5/1999 | Gatto et al. | |
| 5,909,638 A | 6/1999 | Allen | |
| 5,914,712 A | 6/1999 | Sartain et al. | |
| 5,956,716 A | 9/1999 | Kenner et al. | |
| 5,995,708 A | 11/1999 | Corey | |
| 6,732,158 B1 * | 5/2004 | Hesselink et al. .......... | 709/208 |
| 6,802,076 B1 * | 10/2004 | Terakado et al. ............. | 725/38 |
| 6,885,809 B1 * | 4/2005 | Asada ......................... | 386/46 |
| 2001/0039659 A1 * | 11/2001 | Simmons et al. ............. | 725/61 |
| 2002/0046407 A1 * | 4/2002 | Franco ........................ | 725/110 |

* cited by examiner

*Primary Examiner*—Ngoc Vu
(74) *Attorney, Agent, or Firm*—Rosalio Haro (57) ABSTRACT

A local user issues recording instructions via the Internet to a remote computing device. The remote recording device records broadcast programs available to it according to the received recording instructions, and compresses and encodes the recorded program into a specified media format. The file holding the encoded broadcast program may be subdivided into multiple smaller files before being moved into another computer specified by the user and accessible via the Internet. The remote computing device may receive recording instruction via a pulse telephone and may be incorporated into existing video cassette recorders.

42 Claims, 9 Drawing Sheets

REMOTE ACCESSIBLE PROGRAMMING

BACKGROUND OF THE INVENTION

1. Field of the Invention

This invention relates generally to a system for remote scheduling of program recording and retrieval of the recorded program.

2. Description of the Related Art

Much work has been devoted to facilitating the selection of movies for viewers. For example, U.S. Pat. No. 4,920,432 and U.S. Pat. No. 5,781,734 describe systems for use in hospitals and hotels wherein a private movie distribution system is provided. A viewer selects from an internal library of movies and video games, and the selection is sent by an internal transmission line to the room where the viewer resides. Such systems however do not permit for remote viewing since the viewer must be within the private movie distribution system, and movie selection is limited to the contents of the internal library.

Another system that aims to increase the size of the movie distribution system to permit remote viewing is the so-called movie-on-demand system available over cable television networks. Exemplary on-demand systems are described in U.S. Pat. No. 5,995,708, U.S. Pat. No. 5,914,712, U.S. Pat. No. 5,956,716, U.S. Pat. No. 5,758,257, and U.S. Pat. No. 4,506,387. These systems describe various methods for a user to communicate with a central movie distribution system and to select a movie for viewing. They also describe various methods of organizing the available movie selections, distributing selected groups of movies to different geographic clusters of viewers, and for building a movie preference profile for viewers.

Although these movie-on-demand systems do achieve a much larger movie distribution network than the private systems used in hospitals and hotels, they are still limited to specific geographic areas that they may service. Furthermore, their systems place some inherent limitations on the number of movies they may offer for selection.

U.S. Pat. No. 5,914,712 describes a movie distribution system that uses telephone networks to distribute movies. The system is described as being limited to fiber optic telephone networks due to practical bandwidth limitations, but permits a user to telephone a central movie distribution network and a make a movie selection. The move is then transmitted to a specialized receiving box for display on a television. This system may eventually permit unlimited remote viewing of a movie as more and more telephone networks are transferred from wire to fiber optic networks, but this transition is very costly and currently limited to selected geographic areas. Furthermore, the described system requires that a user call in and select from a recorded list of available movies, this greatly limits the number of movie choices.

Another system that uses telephone networks to transmit multimedia information is described in U.S. Pat. No. 5,956,716. This system is intended as an information service for travelers and maintains a library of news clips, news text, and audio announcements. It is explained that the news clips and audio announcements are preferably transcribed to text format for easier distribution. Basically, the system maintains a profile of each registered user and selected various news items that may be of interest to the user. These news items are periodically downloaded to the users' computers for review. Although this system achieves remote viewing, it is limited to small news and movie clips, and does not permit the viewer to select items for viewing. Rather, pre-selected items are transmitted to the viewer's computer.

A system that aims to increase the amount of movie selection available to a consumer is described in U.S. Pat. No. 5,909,638. It is explained that when a consumer visits a video store, it is likely that the video store may not have the movie the consumer seeks since the store has a limited amount shelf and storage space. Therefore, a system is proposed whereby a fiber optic network links multiple video stores and kiosk video vending machines to a central distribution library. A consumer makes a movie selection, and if the movie is not locally available, it will be transmitted from the central distribution library to the store or kiosk. The user selects the type of media desired, such as DVD or VHS, and the received move is recorded onto the selected media for the consumer. Although this system increases the amount of move selection, it is still limited to the number of remote sites it may service since all the receiving sites in the network, i.e. video stores and kiosks, must me linked by a proprietary fiber optic network.

Lastly, all of the above systems provide a method for selecting from a list of available movies in a standardized library, but it is sometimes desirable to select a program that is not available in a standardized library. This is the case, for example, when one wishes to watch a televised program scheduled to air at an inconvenient time and/or location. In such a case, one may use a video cassette recorder, VCR, to record the program for later viewing, but this requires that the user be home to activate or program the VCR, and thus does not permit for remote access. U.S. Pat. No. 5,420,913 describes a system whereby a remote user may program a VCR by telephone, but the user must still wait until he/she returns in order to watch the recorded program or have the VCR's video tape mailed to the user's remote location for viewing.

Therefore, what is needed is a system for remote viewing of televised programs that is not limited to specific geographic regions, not limited to a small sub-set of available programs, and is not limited to specialized fiber optic networks.

It is an object of the present invention to provide a system for remote recording and retrieval of televised programs without requiring that recorded items be mailed, or otherwise shipped, to a remote user.

It is further an object of the present invention that this system be compatible with exiting television and telephone network infrastructure.

SUMMARY OF THE INVENTION

The above objects are achieved in a remote record and retrieve system that permits a mobile user quick access to broadcast programs from remote locations. A user on a local computing device connects to a remote computing device through a computer network, such as the Internet. The Internet is preferred since it permits a mobile user easy access to remote computer networks throughout the world. The remote computing device has access to a television or radio tuner, to a recording mechanism, and to a data compression and encode mechanism. The user transmits recording instructions via the Internet to the remote computing device, which then proceeds to prepare the tuner and recording mechanism according the received instructions. The program scheduled for recording is also digitized, compressed and encoded into any one of a plurality of available media formats such as MPEG1, MPEG2, AVI, etc. The recorded program is then transmitted via the Internet to the local user. The recorded program may be emailed to the user, or may be transferred to a user specified machine accessible via the Internet by use of the Internet file transfer protocol, FTP.

Preferably, the remote computing device is aware of differences in the media format received by its tuner and the media format used by the remote user to play the recorded program. For example, if the remote computing device is in Europe receiving television signals in PAL format, and the remote user is in North America and has a television that requires NTSC format, the remote computing device will perform any required format conversion prior to transmitting the encoded program to the local user.

In a preferred embodiment, the user transmits via the local computing device additional information to the remote computing device. For example, the user may place a limit on the size of encoded files it may receive from the remote computing device. In this case, the remote computing device will divide a large file holding the encoded, recorded program into multiple smaller files of size not larger than the user specified maximum file size. The remote computing device further generates a master sequence file specifying the order in which the multiple smaller files should be played in order to form a contiguous playing session similar to that of the larger file.

Ideally, encoded program files are deleted at the remote computing device location after the files are transmitted to the remote user. The user may schedule multiple non-concurrent programs and multiple concurrent programs for recording. In this case, the user may assign a different priority level for each program. Since the remote computing device has a limited amount of storage space, and a file is ideally not deleted until it has been successfully transmitted to the user, there exists the possibility that the storage space available at the remote computing device may be full and not able to store any additional scheduled recordings. In this case, multiple management schemes using the assigned priority levels are used for determining when one scheduled program may override another in the storage space.

The above system may be implemented in a server-client arrangement, with the server being the remote computing device and the client being the local computing device. Alternatively, the remote computing device may be a general purpose, personal computer having a tuner card and having encoding hardware/software along with appropriate interface software. The above system may also be a specialty consumer box for interfacing a VCR with the Internet, or may be incorporated into the functionality of a VCR.

Other objects and attainments together with a fuller understanding of the invention will become apparent and appreciated by referring to the following description and claims taken in conjunction with the accompanying drawings.

BRIEF DESCRIPTION OF THE DRAWINGS

In the drawings wherein like reference symbols refer to like parts.

DESCRIPTION OF THE PREFERRED EMBODIMENTS

Figure 1:
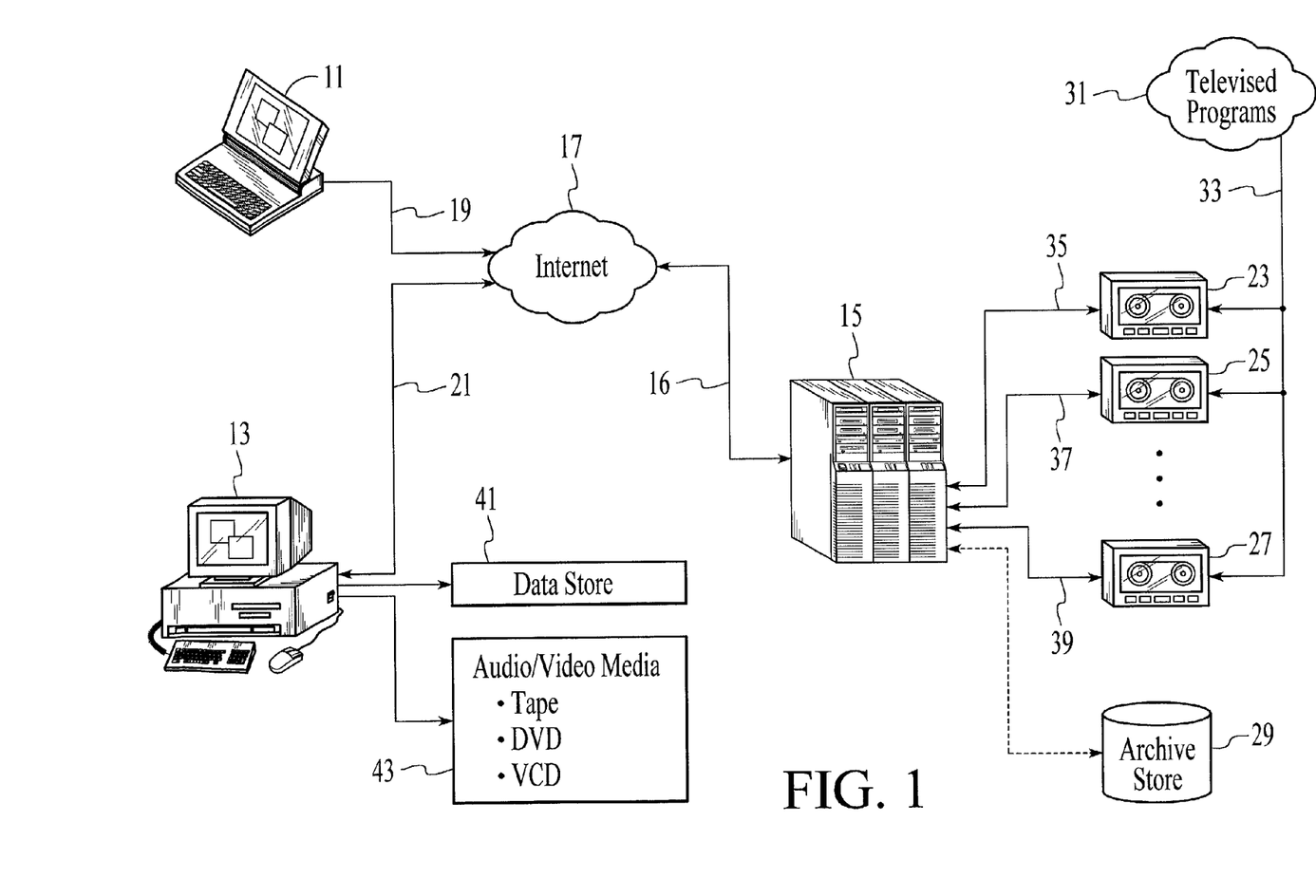
FIG. 1 illustrates a first embodiment of the present invention wherein a remote computing device is implemented as a computer server or a personal computer.

With reference to FIG. 1, multiple users, represented as user computing devices 11 and 13, are in communication with a specialized network server 15 via the Internet 17. Of course, server 15 may optionally communicate with user computing devices 11 and 13 via any type of network, but the use of the Internet 17 is the presently preferred implementation. In the present first embodiment, users 11 and 13 are remote from each other and each has access the Internet 17 via different networks represented as separate links 19 and 21, respectively.

Server 15 has access to the Internet 17 via link 16, and is also coupled to a plurality of recording devices 23–27 and to an optional separate archive store drum 29. Recording devices 23–27 are shown to include a tape recording mechanism and may be implemented as videocassette recorders, but other recording mechanisms and mediums, such as those associated with digital recordings, are likewise applicable to present invention. Recording devices 23–27 preferably include tuning devices for receiving televised programs 31. Televised programs 31 are symbolically illustrated as a cloud and represent all locally available broadcast programs such as available from locally aired television networks and locally available cable television networks. It is to be understood that each of recording devices 23–27 may be tuned to a different televised program along symbolic link 33, which may be an antenna, a cable line, a satellite feed, or any other known broadcast reception medium.

Recording devices 23–27 are controlled by server 15 via respective communication links 35–39. Server 15 can independently control key functions of recording devices 23–27, such as tuning, record start and stop functions, and fast forward and reverse operations. In response to instructions from users 11 and 13, server 15 will activate and tune an available recording device 23–27 to a specified televised program and commence recording. Once the televised program as been recorded, server 15 rewinds the recorded program and replays its once again. This time, the played recording is sent to server 15, which proceeds to digitize and compress the signal into any one of a plurality of available video encoding formats, such as MPEG 1, MPEG 2, AVI, etc. After the recorded televised program has been digitally encoded, the recorded televised program may be erased. The resultant video encoded data file is then transmitted via the Internet 17 to a target user, 11 or 13, defined as the user that originally issued the recording instructions. Should the target user not be available, the video encoded data file may be temporarily stored in optional archive data store drum 29. The video encoded data files stored in drum 29 are preferably given a date stamp and maintained for a predetermined period of time, during which server 15 attempts to retransmit the file to its target user 11 or 13, and the file is further available for pick up by its target user. After the elapse of the predetermined period of time, the file is deleted.

It is preferable to limit the number of copies of a televised program. Therefore, the video encoded data file is preferably deleted immediately following its delivery to its target user 11 or 13. Alternatively, delivered video encoded data files may be maintained in drum 29 for a predetermined period of time during which it may be made available to other users requesting the same televised program.

A user that receives an encoded data file from server 15 may view the recorded televised program by running an appropriate decoding program or by activating an appropriate viewing device. The received file may be stored in a separate first data store 41, or may be transferred onto a standard video recording media 43, such as video compact disk (VCD), versatile compact disk (DVD), video cassette tape, etc.

Figure 2:
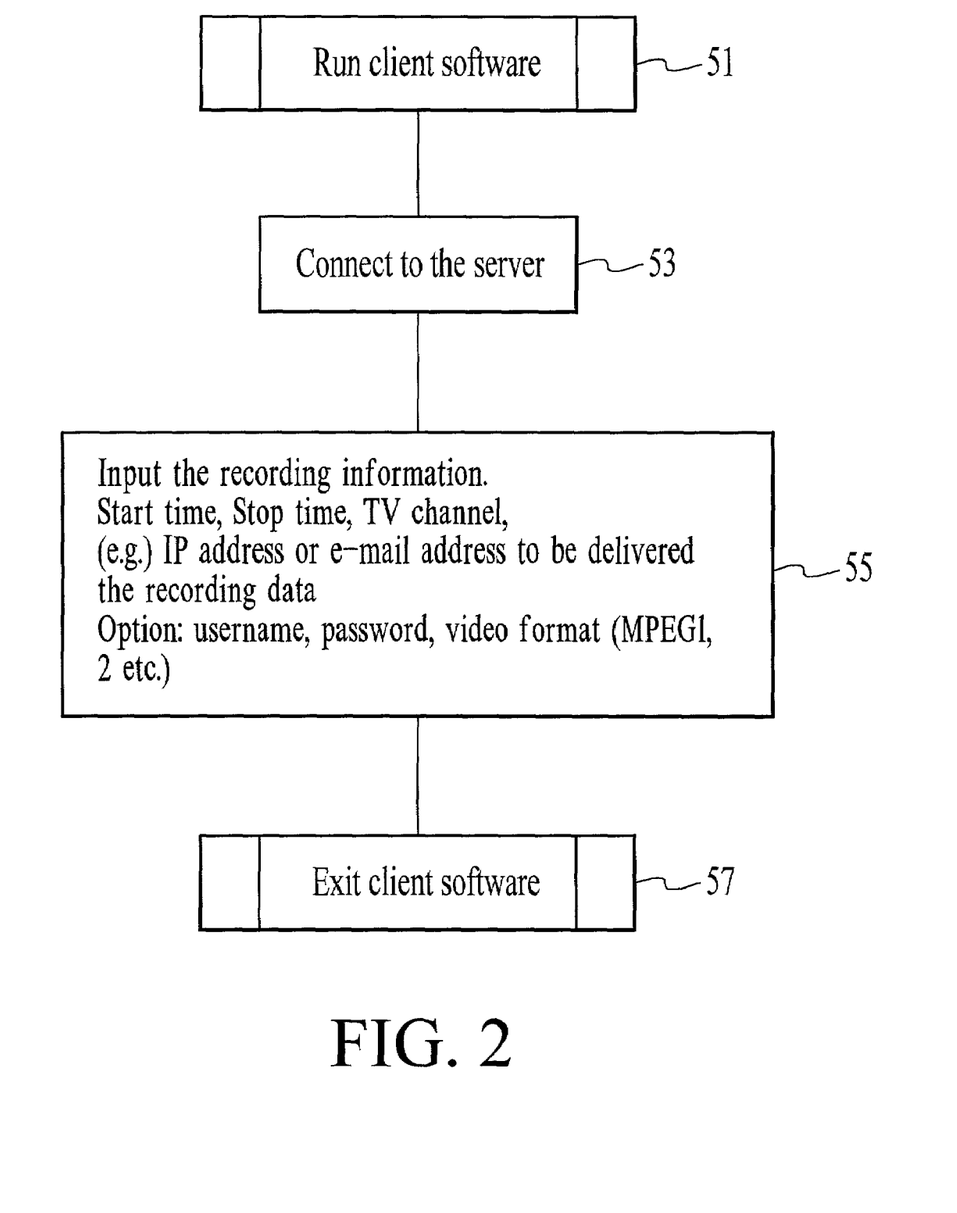
FIG. 2 is first routine used by a user on a local computing device to submit recording instructions to a remote computing device.

In the present embodiment, users 11 and 13 function as clients to server 15. With reference to FIG. 2, in operation, a user, or client, initiates a remote record and retrieve process by running client software 51 that brings up an interface screen and begins the process of contacting server 15. The user then connects 53 to server 15 to open a communication channel. Server 15 may optionally require authentication information such as a user name and password before permit access to the prospective user. This would be the case if, for example, server 15 provides its services on a subscription basis and maintains a separate account file for each registered user, or client.

Once a user is permitted access to server 15, the user may submit various recording instructions such as a tuning channel selection and a start and stop recording interval. Additionally, the user may select among various available multimedia encoding formats such as MPEG 1, MPEG 2, AVI, etc. for each recording session, and may also submit various encoding options that affect the compression ratio of a recording. For example, in order to reduce the file size of an encoded recording of given time length, a user may select a view screen size smaller than standard as well as select a lower video resolution quality.

Optionally, the server may provide the user with a list of scheduled broadcast programs. A user may then submit recording instructions by selecting a scheduled program from the list. In this case, the user does not need to submit tuning information or start and stop times since that information is already known to the server. The user may still be required to provided preferred settings such as encode format, resolution quality level, and so on.

As explained above in reference to FIG. 1, a user may transfer a received video encoded data file onto various types of media 43, which have differing recording capacity. For example, a CD has a typical storing capacity of about 650 megabytes and a DVD has a typical storing capacity of multiple gigabytes. Other storing media have storing capacities ranging from slightly above one megabyte, such as a standard 3.5 floppy disk, to several hundred or thousand megabytes, such as digital recording tape. Therefore, server 15 preferably offers the user an option to submit a maximum file size for each recording session. In this case, the encoding of the total recording session is divided into multiple files of size not greater than the entered maximum size.

Figure 3:
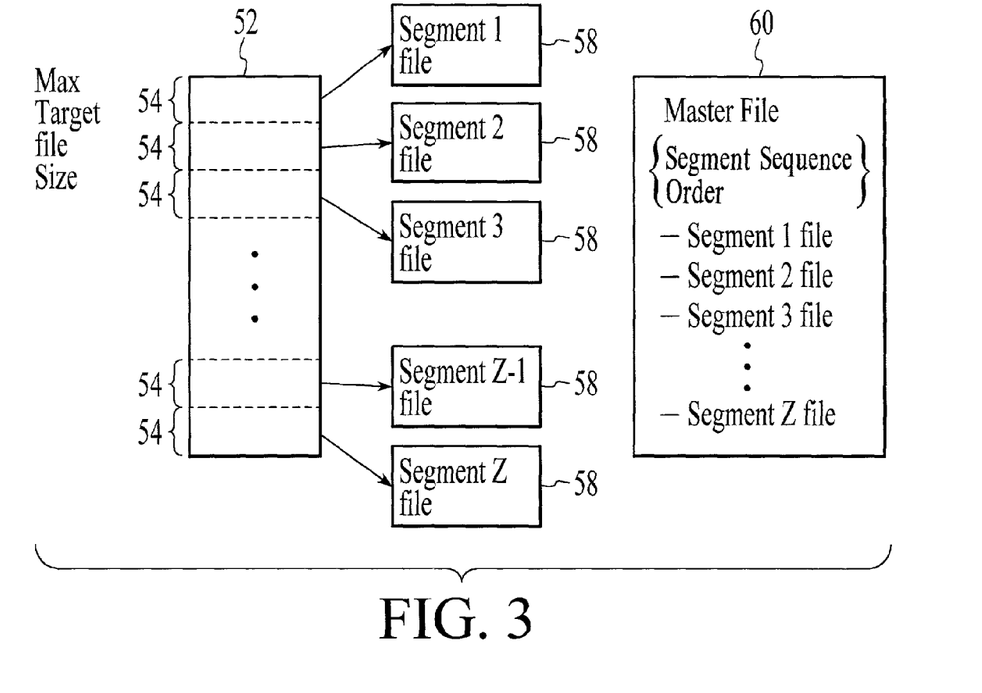
FIG. 3 is a diagrammatic example of a large file being divided into multiple smaller files of a given maximum size.

This operation is illustrated in FIG. 3, wherein the size of an otherwise unspliced file 52 corresponding to a complete recording session is shown to be bigger than a submitted maximum file size 54. Therefore, unspliced file 52 is subdivided into multiple smaller files 58 each having a video segment of the entire unspliced file 52. The contiguous video segments 1 through z are identified and a master sequence file 60 is generated. Master sequence file 60 specifies the sequence in which the multiple files should be played in order to maintain a viewing sequence similar to that of unspliced file 52. File segments 58 and master sequence file 60 are transmitted to a location specified by the user that submitted the recording instructions.

Therefore, during the submitting of programming instruction, shown in box 55 of FIG. 2, the user preferably submits an internet protocol, IP, address to which server 15 should transfer the encoded file, or the user may submit an email address to which the encoded files should be electronically mailed. After all information has been submitted, a user logs off and exits the client software 57.

Figure 4:
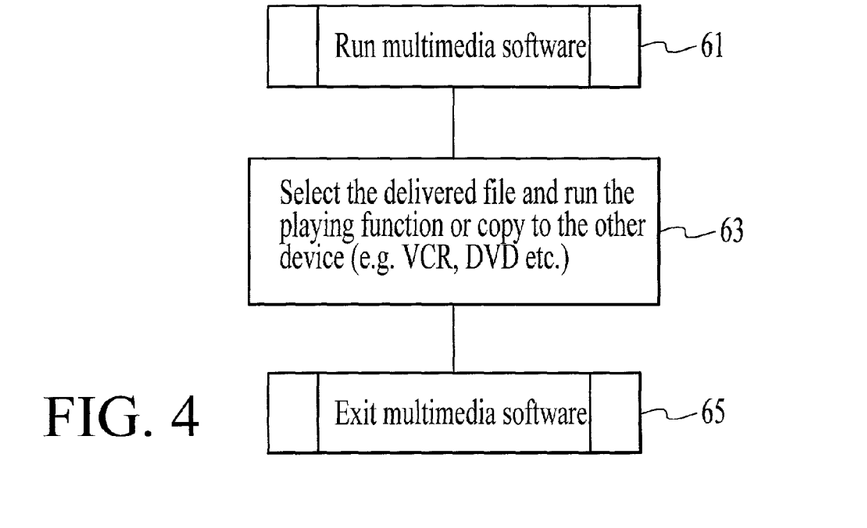
FIG. 4 is a second routine used by a user to play a received encoded file.

With reference to FIG. 4, once a recorded program has been encoded and received by the user, it may be viewed by the user by running appropriate multimedia software 61 and selecting the file to be played 63. Alternatively, the file may be transferred to a portable media such as a DVD, or transferred onto videotape by means of a videocassette recorder. The user may then terminate the multimedia program 65.

Figure 5:
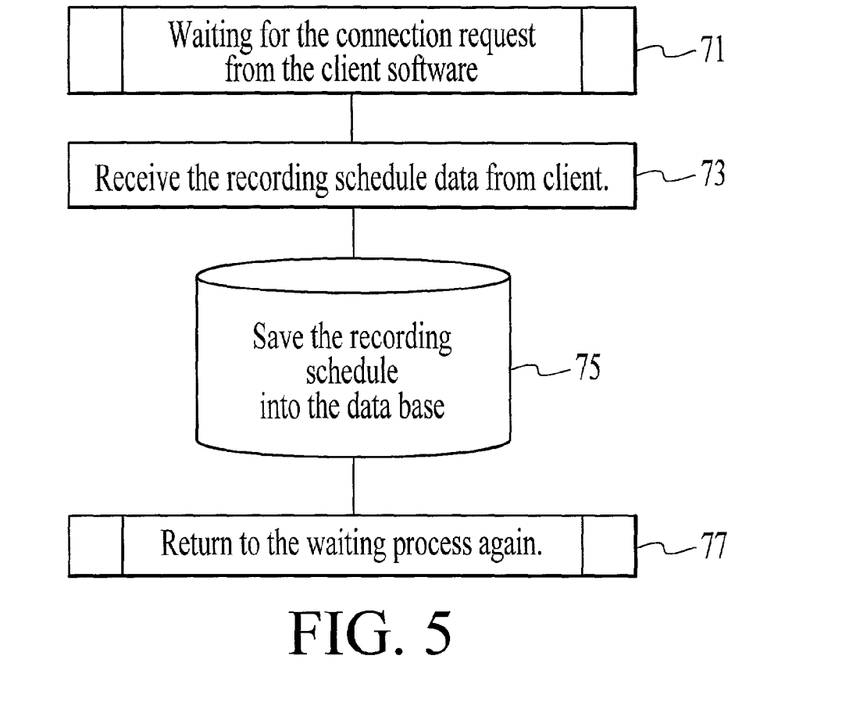
FIG. 5 is a first routine used by a remote computing device for responding to and accepting recording instructions from a user.

Server 15 similarly follows various routines. With reference to FIG. 5, server 15 is continuously responsive to connection requests 71 from users, and responds to such a request by preferably initiating an authorization sequence for a connected user. After a user has been verified and granted entry, server 15 receives recording instruction 73 from the user along with any additional parameter data such as choice of encoding format, resolution quality, etc. This data is stored in a database 75, and once the user logs off, server 15 returns to waiting for the next user request for connection 77.

Figure 6:
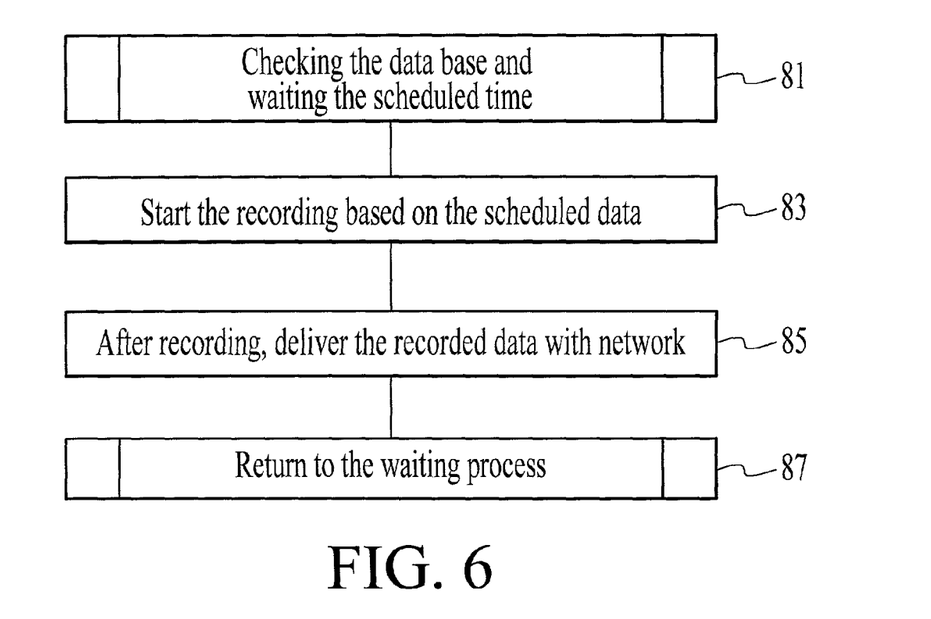
FIG. 6 is a second routine used by a remote computing device to determine when to initiate recording of a broadcast program and deliver an encoded program file to a user.

With reference to FIG. 6, in a second routine, server 15 continuously compares scheduled recording times with an internal clock to determine when a recording session should be initiated, as shown in box 81. When the comparison shows that a recording session is imminent, a recording device is tuned to the appropriate channel and a recording session is initiated 83. Following the recording of the program, step 85 explains that the recorded program is digitally encoded, if not already recorded in a digital format, and sent through network 17 to its target recipient. At this point, step 87 returns server 15 to a state of observing the database and waiting for the next recording session.

In FIG. 1, the remote computing device controlling the remote record and retrieve operation of televised programs is illustrated as computer server 15 with access to multiple video tape recording devices 23–27. In this case, the present invention is implemented as specialized software running on a general purpose computer 15 along with specialized hardware for permitting communication between server 15 and multiple video recording devices 23–27, but other variations on the invention are likewise possible.

Figure 7:
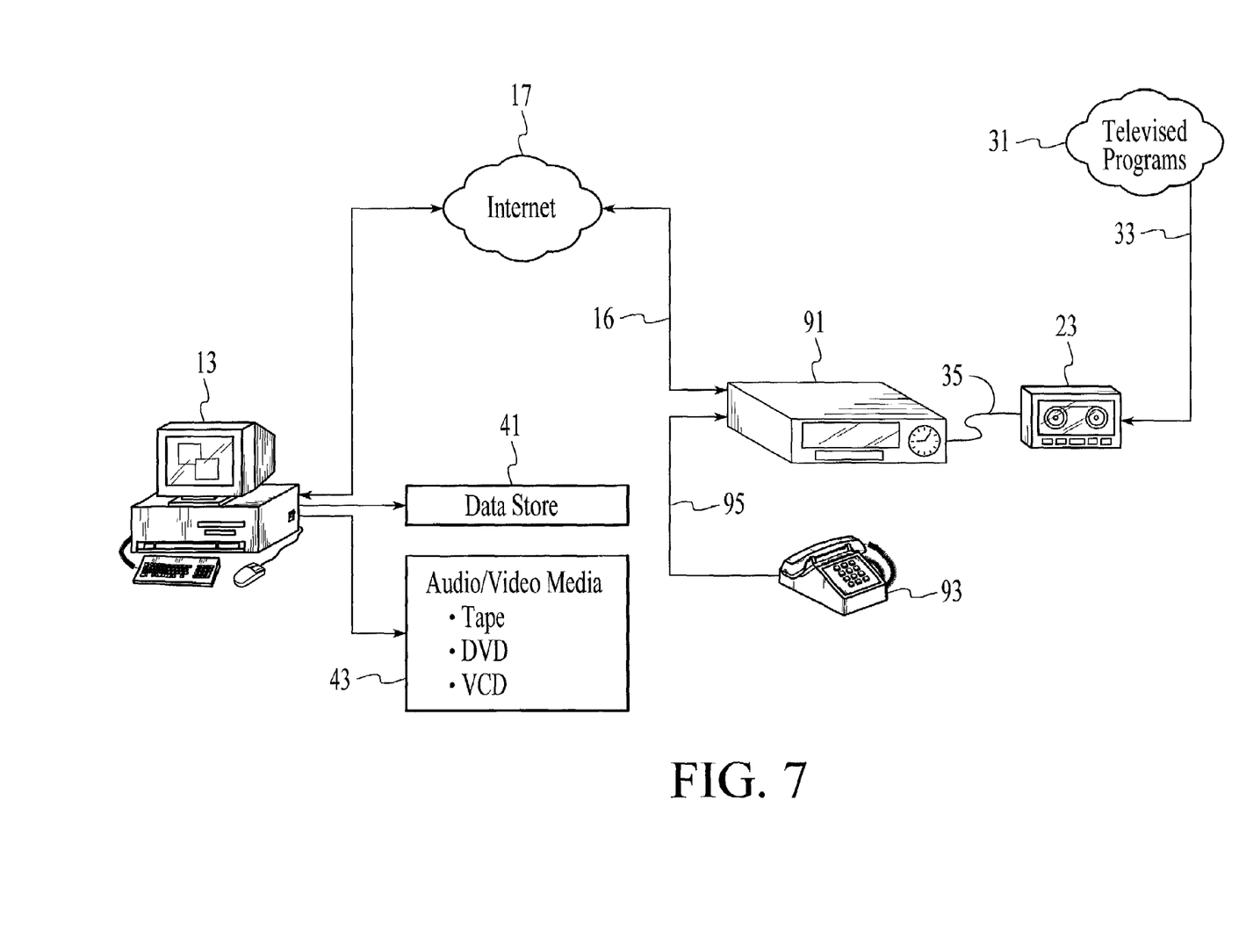
FIG. 7 is a second embodiment of the present invention wherein a remote computing device is implemented as a specialty consumer electronics box.

With reference to FIG. 7, a second embodiment of the present invention replaces server 15 with a specialized multimedia box 91 functioning as a computing device controlling a single recording device 23. All elements in FIG. 7 similar to those of FIG. 1 have similar reference numerals and are defined above. Multimedia box 91 is linked to the Internet 17 via link 16 and receives recording instructions from remote user 13 via the Internet 17 in a manner similar to that of server 15 in FIG. 1. Multimedia box 91 also implements similar functions of scheduling, recording and encoding broadcast programs in a manner similar to that of server 15 in FIG. 1.

In the present case, however, multimedia box 91 may also receive recording instructions by touchtone telephone 93 via communication link 95. In a preferred embodiment, a caller on telephone 93 would identify the call as a schedule entry session by entering a predefined key code. If the predefined key code is not submitted within a predetermined period, multimedia box 91 preferably enters a second mode of operation wherein it functions as an answering machine to record received audio messages. The received messages are stored internal to multimedia box 91 and may also be encoded for transfer to a user 13 via the Internet.

Similarly, multimedia box 91 may also include a radio tuner for recording and encoding local radio broadcasts that may be sent to user 13 over the Internet 17.

In the present embodiment, multimedia box 91 and recoding device 23 are illustrated as two separate devices, but they may of course be combined into a single specialty device such as a video cassette recorder with internet access capability.

In FIGS. 1 and 7, the recoding devices 23–27 of the present invention are illustrated as using tape recording mechanisms, but as stated earlier the recording device may use a digital recording mechanism or a combination of the both.

Figure 8:
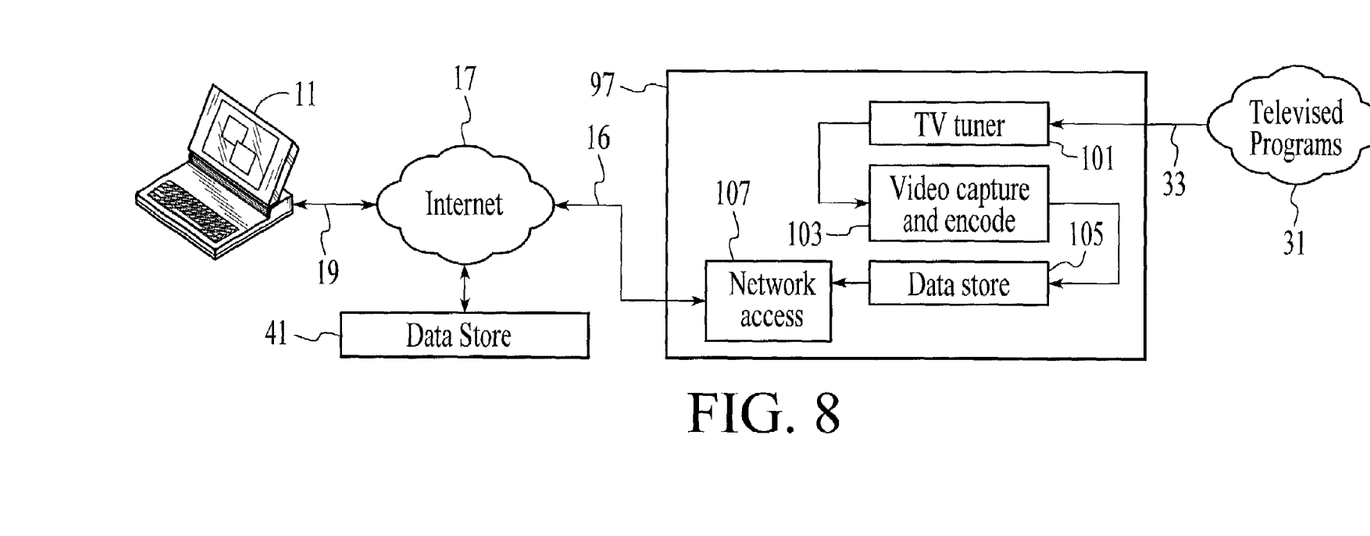
FIG. 8 is a third embodiment of the present invention wherein the remote computing device incorporates all tuning and recording mechanisms internally.

With reference to FIG. 8 a remote record and retrieve system using a digital recording mechanism is shown. All elements in FIG. 8 similar to those of FIGS. 1 and 7 have similar reference numerals and are described above. In FIG. 8, the remote computing device in charge of recording and encoding programs is illustrated as a box 97 exposing some of its key components. Box 97 may be a general purpose computer or a specialized multimedia box. In the present embodiment, remote computing device 97 is shown to have a television tuner 101 for receiving televised programs 31 along link 33. As explained above, computing device 97 may optionally include a radio tuner for receiving and encoding locally aired radio stations. The output of TV tuner 101 is coupled to a video capture and encode box 103, which may be implemented completely in hardware, completely in software, or in a combination of hardware and software. Video capture and encode box 103 is preferably capable of encoding a captured video sequence into any of a plurality of known audio/video digital encoding formats. The encoded data from box 103 is stored in second data store 105. The contents of second data store 105 are then applied to network access box 107 for access to the Internet 17 via link 16. In the present embodiment, data transfer from second data store 105 is initiated after the end of the current record and encode session. Alternatively, transfer of data from second data store 105 onto the Internet 17 may commence prior to the end of the current record and encode session and after a predetermined amount of encoded data has been buffered in second data store 105.

As explained above, the contents of second data store 105 may be a single file or multiple smaller files having segments of a composite recording session, and the contents of second data store 105 may be sent to a user 11 or to first data store 41. In the present example, first data store 41 is not shown isolated from the Internet 17, as was the case in the embodiment of FIG. 1. Rather, first data store 41 is shown accessible via the Internet 17 independent of user 11. This is advantageous for the cases when a user 11 is not capable of maintaining a continuous connection to the Internet 17. In this case, the user provides the IP address of first data store 41 as the target for receiving the recorded and encoded program files. First data store 41 may be, for example, another computer having a faster connection to the Internet than user 11, or may be web space leased from various commercial vendors.

Figure 9:
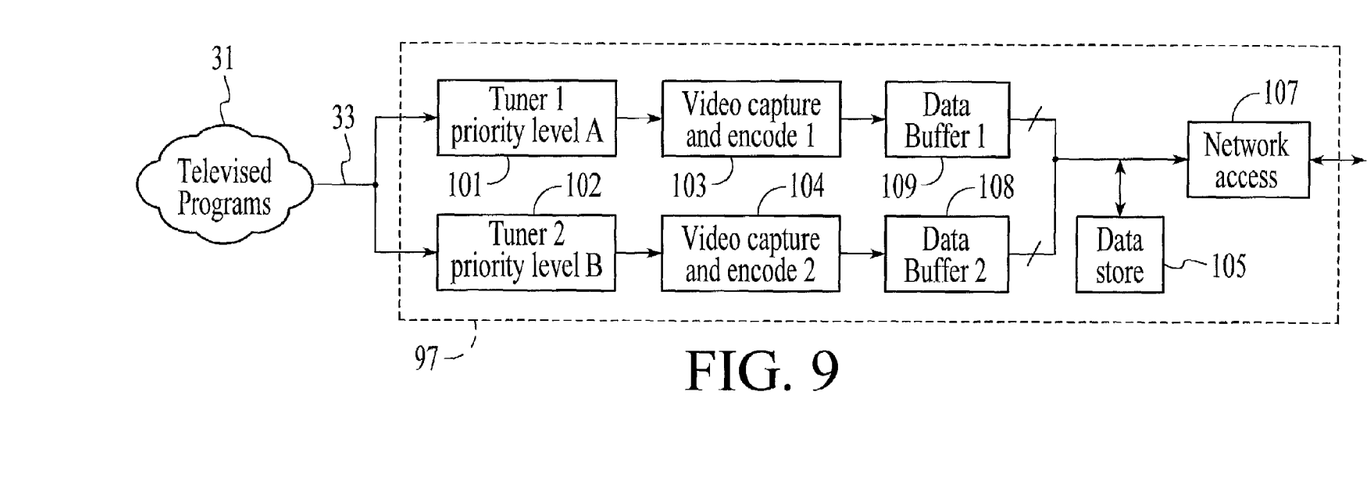
FIG. 9 is a second embodiment of the remote computing device of FIG. 8 showing multiple tuners each having a corresponding video capture and encode box.

With reference to FIG. 9, a multi-tuner implementation of remote computing device 97 is shown. All elements similar to those of FIG. 8 have similar reference characters and are described above. In FIG. 9, televised programs 31 are applied to a first tuner 101 and to a second tuner 102 via link 33. Both tuners 101 and 102 follow parallel paths and thus both have respective video capture and encode boxes 103/104 and respective data buffers 109/108. In the presently preferred embodiment, the parallel paths of both tuners 101 and 102 share a common second data store 105. In order to accommodate two tuners sharing a common data store, the output of first video capture and encode box 103 is applied to its corresponding first data buffer 109, and the output of second video capture and encode box 104 is applied to its corresponding second data buffer 108. The output of first video capture and encode box 103 is cached in first data buffer 109 while data from second video capture and encode box 104 is transferred from second data buffer 108 to data store 105. Similarly, the output of second video capture and encode box 104 is cached in second data buffer 108 while data from first video capture and encode box 104 is transferred from first data buffer 109 to data store 105. Once the recording session is complete, the contents of data store 105 are transferred to network access box 107 for delivery to their respective target destinations. In this manner, the video encoded files from first and second encoders 103 and 104 may be stored in second data store 105 in alternating data blocks corresponding to first and second tuners 101 and 102.

Figure 10:
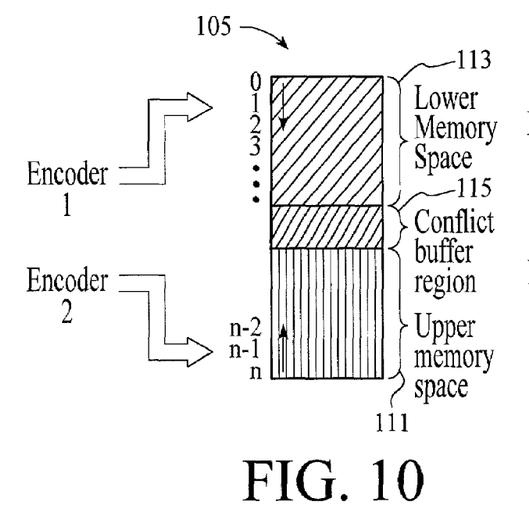
FIGS. 10 and 11 illustrate the use of a first memory manage format for the data store in the remote computing device of FIG. 8.

Alternatively, data from first encoder 103 and second encoder 104 may be stored as shown in FIG. 10. In the present case, second data store 105 is divided into an upper memory space 111, a lower memory space 113, and a conflict buffer region 115 between the upper and lower memory spaces. Data from the first encoder 103 is stored in lower memory space 113 in ascending order from low memory addresses toward upper memory space 111. Conversely, data from the second encoder 104 is stored in upper memory space 111 in descending order from upper memory addresses toward lower memory space 113. Whenever either of upper memory space 111 or lower memory space 113 grows to encroach into conflict buffer region 115, a conflict signal is issued.

In the present embodiments having multiple tuners, such as those of FIG. 9 and FIG. 1, when a user issues recording instructions to a remote computing device in charge of the multiple tuners, the user preferably assigns a priority level to the programs selected for recording and thereby to their associated tuners. In the case when one of upper memory space 111 and lower memory space 113 encroaches into conflict buffer region 115, computing device 97 resolves the priority level of the first tuner 101 and second tuner 102 and their corresponding first 103 and second 104 encoders. The encoder corresponding to the tuner of lower priority is deactivated, and the encoder corresponding to the tuner of higher priority is permitted to grow through the conflict buffer region 115 and to encroach within the memory space corresponding to the encoder of lower priority.

Figure 11:
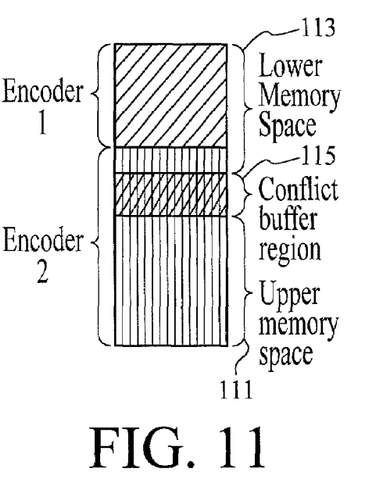

With reference to FIG. 11, an example is shown wherein second tuner 102 has a higher priority level than first tuner 101 and second encoder 104 is therefore permitted to grow beyond conflict buffer region 115 and encroach within the lower memory spacer previously assigned to first encoder 103.

Figure 12:
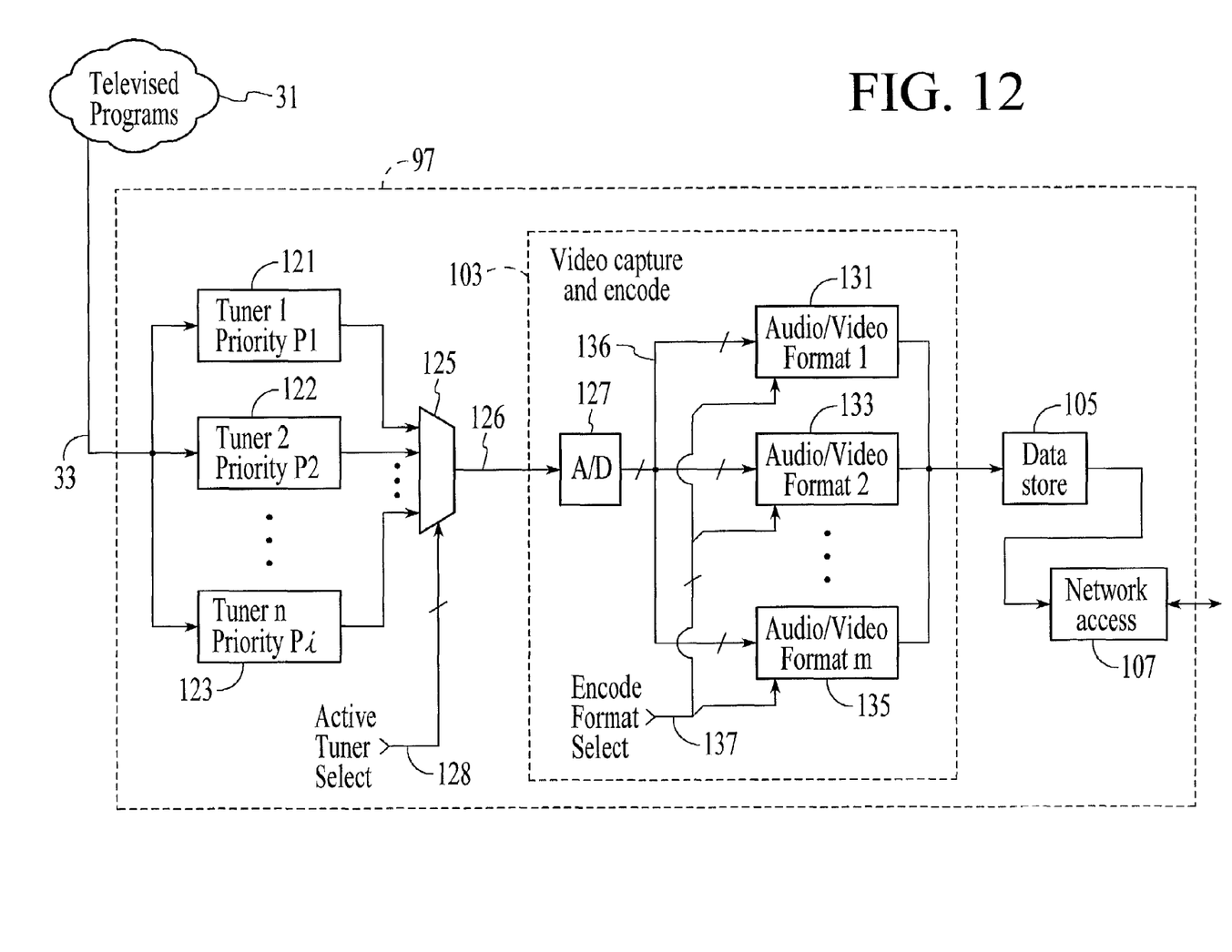
FIG. 12 is a third embodiment of the remote computing device of FIG. 8 showing multiple tuners sharing a common video capture and encode box.

With reference to FIG. 12, another embodiment of the present invention permits multiple tuners 121–123 to share a common video capture and encode box 103. All elements similar to those of FIGS. 1, 7, and 8 have similar reference characters and are described above. Multiple tuners 121 to 123 receive televised programs via link 33 and may each be tuned to a separate program, but it is to be understood that not all tuners are necessarily active at the same time. Multiple tuners are active simultaneously only when it is desirable to record multiple programs that are airing simultaneously. The output of tuners 121–123 are applied to a multiplexer 125 responsive to active tuner select bus 128. Multiplexer 125 sequentially alternates between active tuners, ignoring any inactive tuners, and transferring the signal from a currently selected active tuner to its output 126.

The output 126 of multiplexer 125 is coupled to video capture and encode box 103, which is illustratively shown to include multiple audio/video encoding format capabilities represented by boxes 131–135. It is to be understood that encoding boxes 131–135 may be implanted in hardware or software. The input to capture and encode box 103 is applied to an analog-to-digital converter 127 whose output is applied to audio/video encoders 131–135. Analog-to-digital converter 127 is of course not necessary if the output of tuners 121–123 is a digital output and not an analog output. Each of audio/video encoders 131–135 is responsive to a separate enable signal from encode format select bus 137. Only an enabled audio/video encoder 131–135 may latch in data on shared input bus 136 and may drive shared output bus 138. As was explained earlier, a user submitting recording instruction may assign a different encode format for each program to be recorded. Therefore, encode format select bus 137 activates the appropriate encoder 131–135 for each tuner 121–123 selected by multiplexer 125. The encoded output from video capture and encode box 103 is sent to second data store 105, which is applied to network access box 107 for communicating with the Internet 17.

Figure 13:
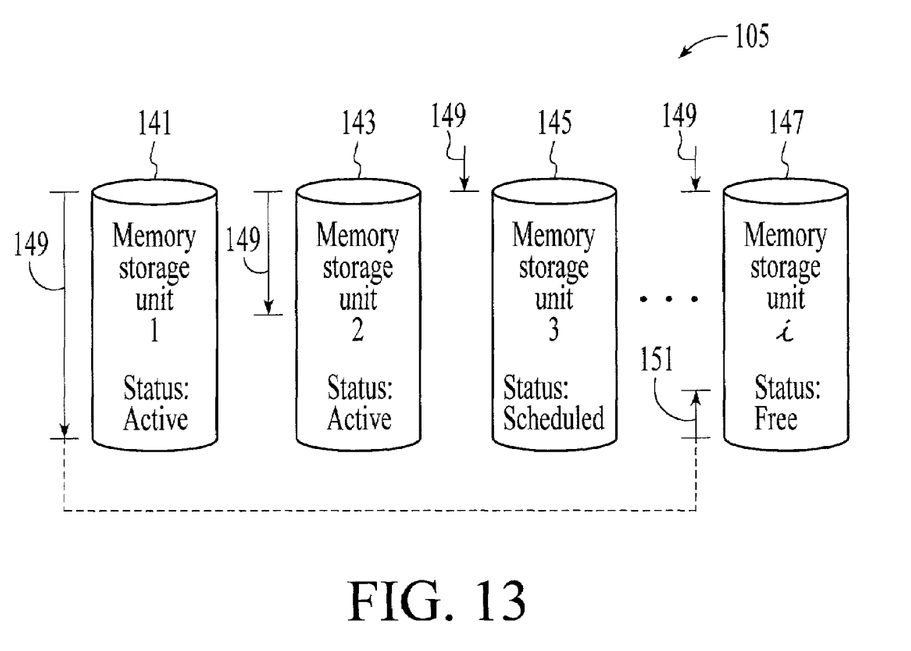
FIG. 13 is a second memory management format for the data store in the remote computing device of FIG. 8.

Second data store 105 may have various configurations, such as that shown in FIGS. 10 and 11. A second preferred memory configuration for second data store 105 is shown in FIG. 13. In the present example, second data store 105 includes separate memory storage units 141–147 having a one-to-one correspondence with tuners 121–123 of FIG. 12. That is, memory storage unit 1 (141) corresponds to tuner 1 (121), memory storage unit 2 (143) corresponds to tuner 2 (122), and so on up to data storage unit i (147), which corresponds to tuner i (123). Each of memory storage units 141–147 is further given a status rating and priority level mirroring its corresponding tuner. If a tuner is active, its corresponding memory storage unit is likewise assigned a status of "active". If a tuner is inactive but is scheduled for use at a later time for a recording session, its corresponding memory storage unit is assigned a status of "scheduled". If a tuner is inactive and is not scheduled for later use, its corresponding memory storage unit is assigned a status of "free". Furthermore, any priority levels assigned to a tuner are likewise applied to the tuner's corresponding memory storage unit. If a tuner is not assigned a priority level by a user, then its priority level may be determined from its status rating. In such a case, an "active" tuner is given higher priority than a "scheduled" tuner, and a "scheduled" tuner is given a higher priority than a "free" tuner.

The assigned status and priority levels are used to reassign memory storage units 141–147 when a storage unit corresponding to an active tuner is filled to capacity prior to the end of a program being recorded. For example in FIG. 13, memory storage unit 1 (141) is "active" and has reached its capacity. Rather than deactivating its corresponding tuner 1 (121) and terminating the recording session prematurely, the status and priority level of the other data storage units 143–147 is checked to see if the recording session of tuner 1 can continue and its encoded data stored in another available storage unit. The second data storage unit 143 has a status of "active", meaning that it is currently being used by another tuner, and should not be used by tuner 1 unless no other storage unit is available and tuner 1 has a higher assigned priority level than the tuner currently using the second data storage unit 143. The third data storage unit 145 has a status label of "scheduled", meaning that it has been assigned to a different tuner for recording a scheduled program, and should not be used by tuner 1 unless there are no other data storage units of lower status and priority, and tuner 1 has a higher assigned priority level than the tuner scheduled to use third data storage unit 145. This process is continued until all the available data storage units are identified, and the lowest priority storage unit is reassigned to tuner 1. In the present case, the last storage unit 147 has a status of "free", meaning that it is not being used by any tuner and is not scheduled for use by any tuner. Therefore, tuner 1 remains active and storage of its encoded data is continued in memory storage unit 147.

All the storage units are shown to start at low memory, i.e. at the top of symbolic drums 141–147, and then proceed toward high memory, symbolized by the bottom of drums 141–147. This progression in the use of available memory is represented by arrows 149. Memory storage units that are temporarily reassigned to a different tuner than their normally corresponding tuner, may optionally begin storing data from the reassigned tuner starting at high memory at the bottom and then proceed toward low memory at the top, represented by arrow 151. In this manner, if the encoded data belonging to a temporarily assigned tuner has not been removed from the storage unit when the same storage unit begins receiving data from its normally corresponding tuner, the chances of a data writing conflict between the two tuners is lessened.

Previously it was explained that when a user submits recording instructions to the remote computing device in charge of recording and encoding a televised program, the user may submit an IP address to which the remote computing device may transmit, or push, the encoded program. The remote computing device would preferably use a standard software tool, such as the file transfer protocol, FTP, utility that is part of the suite of protocols available for the Internet. This operation functions without any difficulties if the IP address of the target machine submitted by the user corresponds to machine freely accessible from the Internet, but this may not be the case if the target machine is a within a network using a network addressing translation, NAT, utility.

A fully qualified IP address is necessary for accessing the Internet, but such fully qualified IP addresses are in short supply and increasingly becoming more expensive. Therefore, private networks typically assign nonqualified IP addresses internally to machines within the private network, and have the internal machines share a small number of fully qualified IP addresses when accessing the Internet. A router typically couples the private network to the Internet, and it may use a network address translation routine to translate a nonqualified IP address of an internal machine to a fully qualified IP address when the internal machine wishes to access the Internet.

Network address translation accomplishes this by assigning a socket number to each internal machine wishing to access the Internet, and attaching that socket number to messages that go out to the Internet using a fully qualified IP address. When a response from the Internet is received, the socket number on the returned message is matched to the internal machine that originated the Internet access. The problem is that many machines may share a fully qualified IP address, and the assigning of socket numbers is arbitrary. Furthermore, when one machine disconnects from the Internet the same socket number may be reassigned to another machine. It is therefore not possible to FTP to a specific machine behind a NAT router since the fully qualified IP address corresponds to the router and not to an internal machine behind the router.

Figure 14:
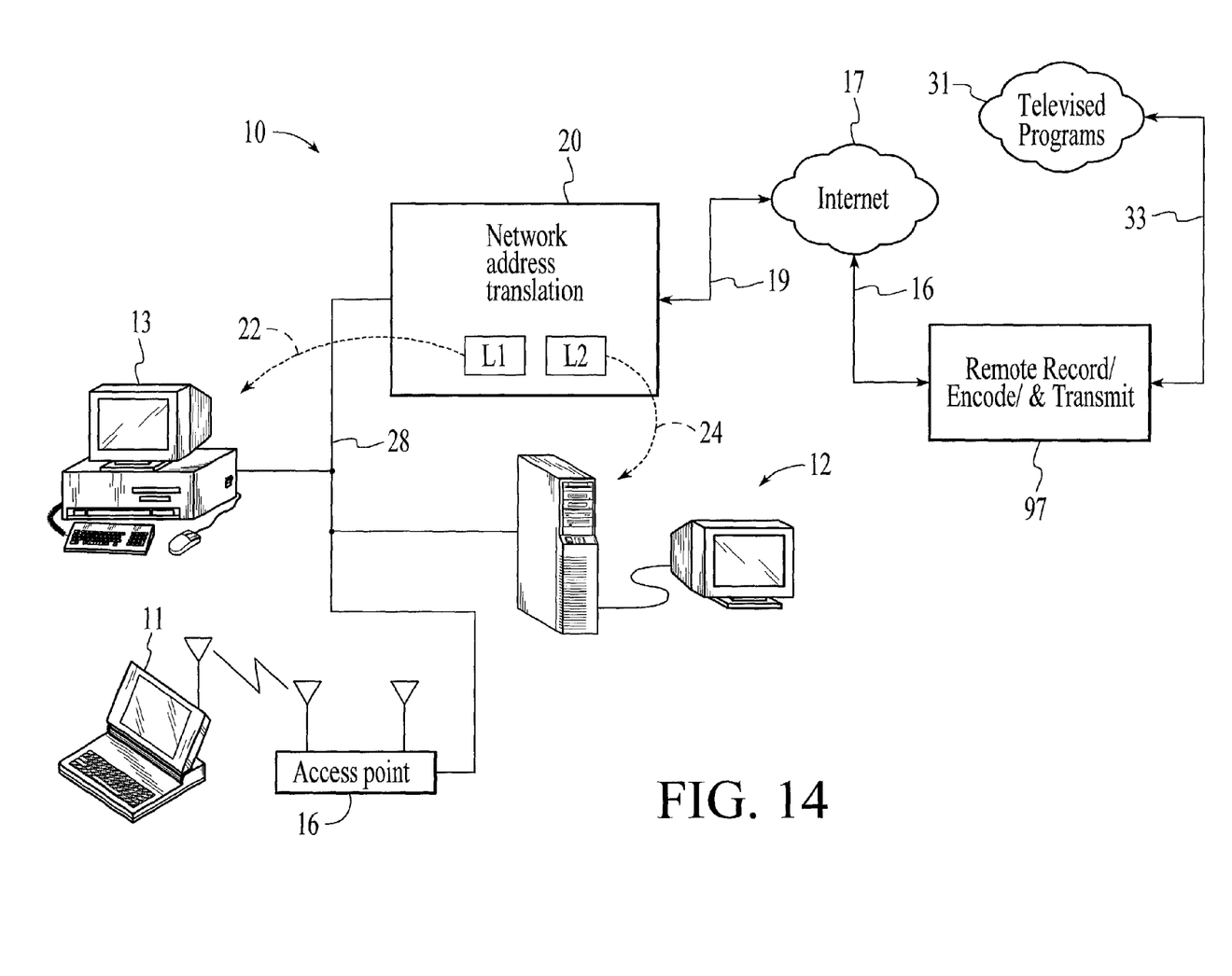
FIG. 14 is an illustration of the present invention in use with a private network using a network address translation router to access the Internet.

With reference to FIG. 14, an arrangement with target user machines behind a private network 10 using network address translation is shown. All elements similar to those of FIGS. 1, 7, and 8 have similar reference numerals and are described above. Router 20 and computing devices 13, 24 and 11 are part of common network 10 and linked by line 28. Computer 11 is shown coupled to network 10 through a wireless connection via access point 16, as is typical in wireless network configurations, but this is not critical to the invention. Router 20 uses a fully qualified IP address to communicate with the Internet 17 along line 19, and uses a nonqualified IP address to communicate with internal network 10 along line 28. Furthermore, each of machines 11–13 use a nonqualified IP address to communicate amongst themselves and to communicate with router 20. As explained above, router 20 implements network address translation so that computers 13, 12 and 11 all share the same fully qualified IP address when communicating with the Internet 17 via router 20, which manages traffic between the Internet and network 10.

Since a user, such as machines 11–13, wishing to communicate with remote computing device 97 cannot identify itself by IP address and its mailbox space may be insufficient for receiving a long recorded program, a user machine 11–13 may instead submit a machine name identifying one of its hard drives. A machine name typically needs to undergo a name resolution routine to identify its corresponding IP address. However, in this case, the target hard drives of the client machines 11–13 may be mounted, or shared, onto router 20 thereby creating virtual drives L1 and L2 within router 20 with links 22 and 24 to their appropriate target machines, 13 and 12. In this case, when remote computing device 97 attempts an FTP operation to a given machine name, and initiates a name resolution routine to identify the corresponding IP address. Router 20 and its fully qualified IP address will be identified as corresponding to the given machine name. Router 20 will then transfer any received files to its respective virtual drives L1 and L2. As data is transferred into virtual drives L1 and L2, it is automatically transferred to the appropriate target machine 13 and 12.

Thus, remote computing machine 97 manages to FTP a finished encoded file to a target user machine even if the target machine is behind a firewall consisting of a network address translation machine.

While the invention has been described in conjunction with several specific embodiments, it is evident to those skilled in the art that many further alternatives, modifications and variations will be apparent in light of the foregoing description. Thus, the invention described herein is intended to embrace all such alternatives, modifications, applications and variations as may fall within the spirit and scope of the appended claims.

What is claimed is:

1. A remote video recording and retrieval system comprising:
   a first computing device having access to a tuner, to a computer network, and to a video recording mechanism, said first computing device being effective for encoding a video signal into at least one predetermined video data encoding format; and
   a second computing device having access to said first computing device via said computer network, and having access to a first data store remote from said first computing device, said second computing device being effective for submitting recording instructions to said first computing device for recording a televised program;
   said first computing device being effective for accessing and recording said televised program via said tuner and said video recording mechanism, said first computing device being further effective for transferring a video encoded data version of said televised program as a video encoded data file to said first data store;
   wherein said first data store is remote to said second computing device, and said second computing device accesses said first data store via Internet to retrieve said video encoded data file.

2. The system of claim 1 wherein said second computing device initiates retrieval of said video encoded data file after recording of said televised program by said first computing device.

3. The system of claim 1 wherein said computer network is the Internet.

4. The system of claim 1 wherein said first computing device deletes said video encoded data file upon completion of the transfer of said video encoded data to said first data store.

5. The system of claim 1 wherein said first computing device provides a verification logon sequence for said second computing device prior to permitting access to said second computing device.

6. The system of claim 1 wherein said first computing device includes a timer and a database of program instructions, said first computing devise comparing program start times with said timer and responding to a matching time by adjusting said tuner to the instructions in said database associated with the matching time and activating said recording mechanism, said first computing devise further using said database to identify conflicts in recording instructions.

7. The system of claim 1 wherein said first computing device verifies that said second computing device has pre-authorization prior to accepting any recording instruction from said second computing device, said first computing device responding to an authorization verification of said second computing device by displaying a list of scheduled televised programs available for recording, each of said listed televised programs being part of a database including the televised program's airing time and frequency tuning requirements, said second computing device instructing said first computing device by making selections from said listing.

8. The system of claim 7 wherein said second computing device is charged a service fee for every recording session submitted to said second computing device.

9. A remote video recording and retrieval system comprising:
a first computing device having access to a tuner, to a computer network, and to a video recording mechanism, said first computing device being effective for encoding a video signal into at least one predetermined video data encoding format; and
a second computing device having access to said first computing device via said computer network, and having access to a first data store remote from said first computing device, said second computing device being effective for submitting recording instructions to said first computing device for recording a televised program;
said first computing device being effective for accessing and recording said televised program via said tuner and said video recording mechanism, said first computing device being further effective for transferring a video encoded data version of said televised program as a video encoded data file to said first data store;
wherein said second computing device specifies a maximum file size for said video encoded data file created by said first computing device;
wherein said first data store is remote to said second computing device, and said second computing device accesses said first data store via internet to retrieve said view encoded data file.

10. The system of claim 9 wherein said first computing device divides a recorded televised program into a plurality of contiguous program segment, encoded, data files of size not greater than said maximum file size.

11. The system of claim 10 wherein said first computing device further generates a master sequence file specifying the order in which said plurality of program segment data files should be played in order to produce a contiguously viewing of said recorded televised program.

12. The system of claim 11 wherein said first computing device transfers encoded data files and said master sequence file in succession to said first data store.

13. The system of claim 12 wherein said first computing device deletes each of said plurality of program segment data files and said master sequence file as their respective transfer to said first data store is complete.

14. The system of claim 13 wherein said first computing system verifies completion of a file transfer by view the contents of said first data store prior to deleting any file at said first computing device.

15. The system of claim 14 wherein each of said plurality of program segment data files is transferred to said first data store as a plurality of file fragment data packets and monitors acknowledge signals from said first data store confirming receipt of each data packet, said first computing device maintaining a log of each acknowledged data packet to identify the complete file transfer of each of said program segment data file and to respond to a transmission interruption by reinitiate transmission of only the data packets of a program segment data file that have not already been acknowledged.

16. The system of claim 15 wherein said first computing device deletes each of said encoded data files upon transfer of all of its constituent file fragment data packets to said first data store.

17. A remote video recording and retrieval system comprising:
a first computing device having access to a tuner, to a computer network, and to a video recording mechanism, said first computing device being effective for encoding a video signal into at least one predetermined video data encoding format; and
a second computing device having access to said first computing device via said computer network, and having access to a first data store remote from said first computing device, said second computing device being effective for submitting recording instructions to said first computing device for recording a televised program;
said first computing device being effective for accessing and recording said televised program via said tuner and said video recording mechanism, said first computing device being further effective for transferring a video encoded data version of said televised program to said first data store;
wherein said first computing device has a second data store, and said first computing device responds to an inquiry from said second computing device by transmitting to said second computing device a list of scheduled televised programs locally available to said first computing device, an alterable preferred video encoding format selection field, a listing of available free space on said second data store, and an expected available recording time based on the currently selected preferred video encoding format and the currently available free space;
wherein said first data store is remote to said second computing device, and said second computing device accesses said first data store via Internet to retrieve said video encoded data file.

18. The system of claim 17 wherein said second computing system issues recording instructions to said first computing device by selecting a program for recording from said list of scheduled televised programs.

19. The system of claim 17 wherein said first computing device permits the selection of at least one of a resolution quality factor and image screen size for each video encoding format, each combination of selected resolution quality factor, image screen size, and video encoding format resulting in a different amount of memory space required per minute of video sequence.

20. A remote video recording and retrieval system comprising:
a first computing device having access to a tuner, to a computer network, and to a video recording mechanism, said first computing device being effective for encoding a video signal into at least one predetermined video data encoding format; and
a second computing device having access to said first computing device via said computer network, and having access to a first data store remote from said first computing device, said second computing device being effective for submitting recording instructions to said first computing device for recording a televised program;
said first computing device being effective for accessing and recording said televised program via said tuner and said video recording mechanism, said first computing device being further effective for transferring a video encoded data version of said televised program to said first data store;

wherein said first computing device has access to multiple tuners for recording multiple programs airing simultaneously, said first computing device further being effective for alerting said second computing device when the number of simultaneous programs scheduled for recording exceeds the number of available tuners;

wherein said first data store is remote to said second computing device, and said second computing device accesses said first data store via Internet to retrieve said video encoded data file.

21. The system of claim 20 wherein said first computing device includes a second memory store divided into multiple memory spaces having a one-to-one correspondence with said multiple tuners.

22. The system of claim 21 wherein said recording mechanism is a digital recording unit multiplexed among said multiple tuners, said digital recording unit being effective for producing a video encoded data representation of an applied tuner and for storing said video encoded data in the applied tuner's corresponding memory space within said second memory store.

23. The system of claim 21 wherein said second memory store includes a contiguous composite memory space divided into an upper memory space and a lower memory space and a buffer memory space between said upper and lower memory spaces, said multiple tuners including a first turner corresponding to said upper memory and a second tuner corresponding to said lower memory, said first tuner having an associated first priority level and said second tuner having an associated second priority level different from said first priority level, the video encoded data corresponding to said first tuner being written in said upper memory space in ascending order toward said lower memory space, and the video encoded data corresponding to said second tuner being written in said lower memory space in descending order toward said upper memory space, said first computing device being effective for initiating a memory conflict routine when one of the video encoded data corresponding to said first tuner and the video encoded data corresponding to said second tuner is encroaches within said buffer memory space, said memory conflict routine being effective for deactivating the recording of the one of said first and second tuners having the lower associated priority level.

24. The system of claim 23 wherein said memory conflict routine is further effective for permitting the one of said first and second turners having the higher associated priority level to expanding its corresponding memory space into the memory space of the tuner having the lower associated priority level.

25. The system of claim 21 wherein each of said digital memory spaces is a separate digital memory storing device, said first computing device being effective for monitoring the amount of available memory within each of said digital memory storing devices and effective for identifying free memory storing devices correspond to tuners that are not currently active, said first computing device further responding to an active tuner filling to capacity its memory storing device by assigned a different free memory storing device to said active turner.

26. The system of claim 25 wherein each of said multiple tuners has an associated distinct priority level and said first computing device includes a low memory conflict routine responsive to the condition wherein all turners are active and a first active tuner fills to capacity its corresponding memory storing device, said memory conflict routine identifying and deactivating the tuner having the lowest priority level and assigning the memory storing device of the lowest priority tuner to said first active turner.

27. A media recording and encoding apparatus comprising:

a tuner for receiving broadcast information;

a record and encode mechanism coupled to said tuner and effective for recording and encoding said broadcast information to produce an encoded data file representation of said broadcast information;

a network access node coupled to the Internet for receiving recording instructions;

a data store coupled to said encode and record mechanism and to said network access node;

said apparatus being effective for activating said tuner and said record and encode mechanism in accordance with said recording instructions, storing said encoded data file in said data store, and transmitting said encoded data file via said network access node to a predetermined destination on the the Internet; and wherein said tuner is one of a plurality of tuners and said second data store further comprising multiple memory storage units having a one-to-one correspondence with each of said plurality of tuners;

each tuner and its corresponding memory storage unit sharing a common status rating indicating if the tuner is active, scheduled for later use, or free, indicating that the tuner is inactive and not scheduled for later use, an active rating being of higher value than a scheduled rating, and a scheduled rating being of higher value than a free rating;

each tuner and its corresponding memory storage unit further sharing an adjustable priority level having a low default value that is selectively adjusted when a tuner is scheduled for said apparatus being effective for monitoring the available memory space remaining in an active tuner's corresponding memory storage unit and effective for initiating a memory reassignment routine in response to said available memory space being below a predetermined value, said memory reassignment routine being effective for identifying a set of memory storage units having the lowest status rating and assigning the storage unit of lowest priority within the set of said active tuner.

28. The apparatus of claim 27 wherein said tuner is one of a television tuner and a radio tuner.

29. A method of remotely recording and retrieving broadcast information comprising the steps of:

a. using a first local computing device to connect to a second remote computing device via a computer network;

b. using said first computing device to submit recording instructions to said second computing device, said recording instructions including a selection of a broadcast station and a recording time window specifying a future time;

c. using said second computing device to tune a broadcast receiver to receive said selected broadcast station and to initiate recording of received signals from said selected broadcast station during said recording time window;

d. encoding said received signals into a predetermined encode format to produce an encoded digital representation of said received signals;
e. using said second computing device to transmit said encoded digital representation to a predetermined destination via said computer network; and
f. accessing said encoded digital representation from said predetermined destination; and wherein said recording instructions specifying the selection of a broadcast station and a corresponding recording time window is defined as a recording session, and step b includes submitting multiple recording sessions to said second computing device, said second computing device assigning a different memory space to each of said multiple recording sessions in a one-to-one correspondence, step d including storing the encoded digital representation of a recording session in its corresponding memory space.

30. The method of claim 29 wherein said computer network is the Internet.

31. The method of claim 29 wherein said broadcast receiver receives television broadcast signals.

32. The method of claim 29 wherein said broadcast receiver receives radio broadcast signals.

33. The method of claim 29 wherein said first computing device is further used to submit a maximum file size to said second computing device, and said encoded digital representation is divided into multiple data files of size not grater than said maximum file size.

34. The method of claim 33 wherein said multiple data files are transmitted to said predetermined destination in step e.

35. The method of claim 33 wherein step d further includes generating a master sequence file indicating the order in which said multiple data files should be accessed.

36. The method of claim 29 wherein said predetermined destination is remote from said first computing device and accessible by said first computing device via said computer network.

37. The method of claim 29 wherein step e includes transmitting said encoded digital representation to said predetermined destination via electronic mail.

38. The method of claim 29 wherein step e includes transmitting said encoded signal representation to said predetermined destination via file transfer protocol, FTP.

39. The method of claim 29 wherein step b includes using said first computing device to selectively assign a priority level to said multiple recording session, and second computing device assigning a default priority level to all recording sessions not receiving an assigned priority level from said first computing device.

40. The method of said 29 wherein each of said multiple recording session includes a priority level and step d includes reassigning a first memory space corresponding to a first recording session having a first priority level to a second recording session having a second priority level higher than said first priority level.

41. The method of claim 40 wherein said first recording session stores data in said first memory space starting from a first end of said first memory space, and said second recording session stores data in said first memory space starting from a second end of said first memory space opposite said first end.

42. The method of claim 40 wherein said second recording session has a correspondingly assigned second memory space, and said first memory space is reassigned to said second recording session in response to said second recording session filling a predetermined percentage of said second memory space.

* * * * *

UNITED STATES PATENT AND TRADEMARK OFFICE
CERTIFICATE OF CORRECTION

PATENT NO. : 7,028,329 B1  
APPLICATION NO. : 09/687271  
DATED : April 11, 2006  
INVENTOR(S) : Kenji Mizutani Page 1 of 1

It is certified that error appears in the above-identified patent and that said Letters Patent is hereby corrected as shown below:

<u>Column 16</u>

Line 15, change "to the Internet" to --to Internet--; and  
Line 39, change "is scheduled for" to --is scheduled for later use;--.

<u>Column 17</u>

Line 19, change "network is the internet." to --network is Internet.--.

<u>Column 18</u>

Line 9, change "encoded signal representation" to --encoded digital representation--.

Signed and Sealed this

Seventeenth Day of June, 2008

JON W. DUDAS  
*Director of the United States Patent and Trademark Office*